UNITED STATES PATENT OFFICE.

FRANK C. MOORE, OF CANTON, OHIO.

PROCESS OF PREVENTING THE INNER WALLS OF RUBBER HOSE FROM STICKING DURING MANUFACTURE.

1,344,143.   Specification of Letters Patent.   Patented June 22, 1920.

No Drawing.   Application filed December 21, 1918. Serial No. 267,819.

*To all whom it may concern:*

Be it known that I, FRANK C. MOORE, a citizen of the United States, residing at Canton, county of Stark, and State of Ohio, have invented certain new and useful Improvements in Processes of Preventing the Inner Walls of Rubber Hose from Sticking During Manufacture, of which the following is a specification.

My invention relates to improvements in processes for manufacturing high grade rubber hose, and it consists in the steps hereinafter set forth.

An object of my invention is to provide a process by means of which the difficulties in manufacturing the inner rubber core or tube which arise from the sticking together of the parts of the uncured core or tube, are obviated.

A further object of my invention is to provide a process by means of which the uncured core or tube after being formed, and before being braided, *i. e.*, covered with fabric, may be economically treated so that after such treatment the uncured core or tube may be left for any length of time without any danger of the inner walls of the tube sticking together, should the tube become compressed for any reason, or of the outer walls of adjacent coils or portions of the tube sticking together, should they come in contact with one another.

A further object of my invention is to provide a process by means of which the sticking together of the parts of the uncured tube may be prevented, while permitting the tube to be braided at any desired time.

Other objects and advantages will appear in the following specification, and the novel features of the invention will be particularly pointed out in the appended claims.

In the making of high grade rubber hose, an inner core or tube of relatively pure rubber is used. It is exceedingly difficult to prevent the inner walls of the tube from being permanently joined together through the accidental compression of the tube, for when the two raw rubber surfaces come in contact they adhere firmly, and such sections of the tube must of necessity, be discarded. The same thing is true of the outer walls of adjacent sections of the tube which come in contact with one another.

Various attempts have been made to remedy this difficulty. It has been proposed to treat the raw rubber tubes with water. This has the effect of making the tubes "stand up" or stiffen, if applied while the tube is hot, immediately after it comes from the tube machine. This effect of the water will last only a few hours, whereas in the ordinary manufacturing process the tube must be left for a longer time than that before it is braided. When the effect of the water wears off, the same difficulty is experienced as before.

It has also been proposed to blow powdered limestone into the interior of the tube by means of air. In practice, however, it is found that the powdered limestone when blown in by air, will penetrate only for a few feet until the inner bore of the tube is completely clogged. Furthermore, the use of compressed air in forcing the limestone dust into the interior of the tube, often results in expanding the tube out of shape, so that it cannot be used. The present invention is designed to obviate these difficulties.

In carrying out my invention I make use of a mixture of powdered soapstone and water. The proportions of this mixture may vary, but I have found in practice that ten parts of water to one part of powdered soapstone forms a mixture which works admirably. This mixture has the consistency of milk. Any suitable means of introducing the liquid into the interior of the tube may be used. Thus I may run the liquid in by gravity, or force it in under pressure. The mixture being perfectly fluid, of course, will not clog up the interior of the tube in the manner in which dry, powdered limestone will clog it up.

When it is desired to treat the interior and the exterior of the tube, the tube may be coiled in any suitable receptacle containing the fluid mixture, the latter being preferably kept in a state of agitation by any suitable means, such as by forcing compressed air into the liquid.

The tube thus treated may be left in the fluid mixture until such time as it is desired to braid the tube, or the tube may be removed from the receptacle and the fluid mixture drained from the tube. In either case, there will be a deposit of soapstone on the walls of the tube which will prevent the adhesion of the walls when the tube is compressed, or the adhesion of the outer walls of the tube when in contact with adjacent portions or coils.

In braiding the tube prior to the curing or vulcanizing of the rubber portions of the hose, it is, of course, necessary to remove the soapstone deposit in order to secure perfect vulcanization. This may be done in a number of ways; it may be washed off with water or other suitable cleansing agent, or if the tube has been previously drained and the deposit of soapstone is dry, it may be blown off by compressed air, or other suitable gas. If the tube is washed with water, it must be dried before the braiding is applied. By the use of compressed air, the removal of the soapstone deposit on a wet tube, and the simultaneous drying of the tube may be effected. Any suitable apparatus may be employed for this purpose.

The braiding of the tube and the subsequent completion thereof may be accomplished in the ordinary manner, as by running a braid of cotton threads and then spreading over this a thin coating of rubber known to the trade as "friction", with alternate layers of braiding and friction until the proper size and strength is acquired. After the first braid is applied, the tube is inflated with air to a certain specified diameter, the ends are sealed up and the subsequent operations are carried out on the inflated tube. After the exterior cover has been applied the hose thus formed is cured in a specially designed press by steam, and the different layers are thus formed into one solid wall.

It will be understood that this process is intended especially for high grade rubber hose. The lower grades of hose generally have cores or inner tubes not made of pure rubber, but of rubber compositions which do not have the adhesive properties of pure rubber, and which, therefore, are not subject to the difficulties encountered in the manufacture of the products of high grade.

While I have specified powdered soapstone in connection with water as being the active agents for the purpose described, it will be understood that my invention contemplates the use of any liquid suitable for the purpose which carries in suspension or solution an agent capable of being deposited on the walls of the uncured tube for the purpose of preventing adhesion.

Thus, lime dissolved in water may be used, or powdered limestone suspended in water or like liquid without departing from the scope of the invention.

I claim:

1. The herein described step in the manufacture of high grade rubber hose which consists in simultaneously applying to the inner and outer walls of an uncured inner tube, a mixture of water and a powdered agent capable of being deposited upon the walls of the tube and preventing the adhesion of said walls.

2. The herein described steps in the manufacture of high grade rubber hose which consists in applying to the walls of an uncured inner tube, a mixture of water and a powdered agent capable of being deposited upon the walls of the tube and preventing the adhesion of said walls, and subsequently driving off the water and removing the deposit.

3. The herein described steps in the manufacture of high grade rubber hose which consists in applying to the walls of an uncured inner tube, a mixture of water and a powdered agent capable of being deposited upon the walls of the tube and preventing the adhesion of said walls, subsequently driving off the water and removing the deposit, braiding the tube, applying alternate layers of rubber and braiding, and finally vulcanizing the rubber.

4. The herein described steps in the manufacture of high grade rubber hose which consists in applying to the walls of an uncured inner tube, a mixture of water and powdered soapstone capable of being deposited upon the walls of the tube and preventing the adhesion of said walls, subsequently driving off the water, and removing the deposit, braiding the tube, applying alternate layers of rubber and braiding, and finally vulcanizing the rubber.

FRANK C. MOORE.